US009236207B2

(12) United States Patent
Browne et al.

(10) Patent No.: US 9,236,207 B2
(45) Date of Patent: Jan. 12, 2016

(54) COMPOSITE BI-STABLE DEVICE

(75) Inventors: Alan L. Browne, Grosse Pointe, MI (US); Nancy L. Johnson, Northville, MI (US); Geoffrey P. McKnight, Los Angeles, CA (US); Andrew C. Keefe, Encino, CA (US); Guillermo A. Herrera, Winnetka, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 13/250,248

(22) Filed: Sep. 30, 2011

(65) Prior Publication Data

US 2013/0081389 A1    Apr. 4, 2013

(51) Int. Cl.
*F03G 7/06* (2006.01)
*H01H 37/32* (2006.01)
*E05B 47/00* (2006.01)

(52) U.S. Cl.
CPC .......... *H01H 37/323* (2013.01); *E05B 47/0009* (2013.01); *F03G 7/065* (2013.01)

(58) Field of Classification Search
CPC .... F03G 7/065; H01R 12/856; H01R 23/686; H01H 71/145; H01H 61/0107; E05B 47/0009
USPC ..................................... 60/527–529; 337/140
See application file for complete search history.

(56) References Cited

U.S. PATENT DOCUMENTS

| 4,601,413 | A |   | 7/1986  | Krawagna |
| 5,619,177 | A | * | 4/1997  | Johnson et al. ............... 337/140 |
| 6,141,831 | A |   | 11/2000 | Novin et al. |
| 6,345,792 | B2 | * | 2/2002 | Bilanin et al. ................. 244/215 |
| 7,575,807 | B1 | * | 8/2009 | Barvosa-Carter et al. .. 428/411.1 |
| 8,135,476 | B2 | * | 3/2012 | Gerber et al. .................. 607/116 |
| 2005/0172378 | A1 | * | 8/2005 | Messiou ............................ 2/115 |
| 2005/0206243 | A1 | * | 9/2005 | Bouche .......................... 307/112 |

(Continued)

FOREIGN PATENT DOCUMENTS

| CA | 2314955 A1 * | 2/2002 | |
| WO | WO 0178978 A2 * | 10/2001 | .............. B32B 27/00 |

OTHER PUBLICATIONS

Zhou et al. "A Glass Transition Model for Shape Memory Polymer and its Composite", International Journal of Modern Physics B, vol. 23, Nos. 6 & 7, p. 1248-1253, World Scientific Publishing Company, 2009.*

(Continued)

*Primary Examiner* — Thomas Denion
*Assistant Examiner* — Laert Dounis
(74) *Attorney, Agent, or Firm* — Cantor Colburn LLP

(57) ABSTRACT

A deformable bi-stable device includes an elastically deformable member having at least two stable configurations and capable of being deformed from a first stable configuration to a second stable configuration, the element passing through an unstable configuration as it is deformed from the first stable configuration to the second stable configuration, and a shape memory polymer layer on or in the elastically deformable member. A method of using this device includes heating the shape memory polymer to a temperature sufficient to reduce the modulus of the shape memory polymer, deforming the deformable member to move from one of the first and second stable configurations to another of the first and second stable configurations, and cooling the device to a temperature sufficient to increase the modulus of the shape memory polymer.

9 Claims, 3 Drawing Sheets

(56) References Cited

U.S. PATENT DOCUMENTS

| | | | |
|---|---|---|---|
| 2006/0036045 A1* | 2/2006 | Wilson et al. | 525/452 |
| 2006/0201149 A1* | 9/2006 | Biggs et al. | 60/527 |
| 2007/0073130 A1* | 3/2007 | Finch et al. | 600/372 |
| 2010/0171393 A1* | 7/2010 | Pei et al. | 310/330 |
| 2010/0229610 A1* | 9/2010 | Garrigan et al. | 70/174 |

OTHER PUBLICATIONS

McKeen. "Effect of Temperature and Other Factors on Plastics and Elastomers, 2nd Edition". William Andrew Publishing/Plastics Design Library. 2008.*

* cited by examiner

COMPOSITE BI-STABLE DEVICE

FIELD OF THE INVENTION

Exemplary embodiments of the invention are related to deformable bi-stable devices and, more specifically, to composite bi-stable devices useful where the energy required to transition between stable positions can be modified.

BACKGROUND

Deformable bi-stable devices are known in the art, and have found many practical applications. Deformable bi-stable devices have been used in a variety of mechanical and electromechanical applications that require a deformable component to occupy one of two stable positions, while being unstable at positions intermediate to the two stable positions. In one application, a deformable bi-stable device may be used as a user input device such as a push-button as commonly used in many devices, including but not limited to computers, telephones, and vehicle control panels. A bi-stable device may be used as a push-button input for such applications where the button will occupy either an "in" or depressed position, or an "out" or undepressed position.

One example of a simple deformable bi-stable device that may be used for such applications is shown in FIGS. 1A and 1B. FIGS. 1A and 1B depict a schematic diagram of an exemplary reconfigurable bi-stable device 10 having a circular deformable panel 14. In FIGS. 1A and 1B, a cylindrical mounting member 12 having an upper lip portion 13 is mounted on a support structure 11. An elastically deformable circular panel 14 is attached to the inner circumference of the mounting member. The elastically deformable panel would have a normally flat state, but is sized to have a diameter in its normal flat state that is greater than the internal diameter of the mounting member 12 so that when it is mounted in the mounting member it is placed under a force load along vectors between opposing points on the circumference of the panel (in the horizontal plane as shown in FIG. 1). This load causes the elastically deformable panel to deform into one of two stable states, described for sake of convenience as an upper or first stable position depicted in FIG. 1A and a lower or second stable position depicted in FIG. 1B. The panel thus acts as a bi-stable snap-action panel, deformable between a convex (from the perspective above) stable configuration and a concave (from the perspective above) stable configuration. This configuration is also sometimes referred to as the "oil-can" configuration because the bi-stable snap action deformation was used in traditional old-style oil cans to displace oil out of an opening in the can. Lip portion 13 of the mounting member provides a convenient location to which to connect any additional components and also serves to conceal any such components and also the mounting location of the panel to the mounting member.

Another well-known deformable bi-stable device is known as the cylindrical shell configuration. This configuration is sometimes also referred to as the "tape measure" or "carpenter's tape" configuration because it is commonly seen in roll-up carpenter tape measures. An exemplary embodiment configuration is shown in FIGS. 2A and 2B. In FIG. 2A, the deformable bi-stable device 20 is shown in a first stable longitudinally straight configuration having a curvature that runs transverse to the longitudinal direction of the straightened structure. The transverse curvature is exaggerated in FIG. 2A for purposes of illustration, and the curvature is often much less severe in most tape measure configurations. In FIG. 2B, the deformable bi-stable device 20 is shown in a second stable coiled configuration. The device 20 may also have other stable kinked configurations, provided that care is taken not to kink the structure beyond the limits of elastic deformation.

The phenomenon of bi-stability may be graphically represented by a plot of potential energy of the deformable member versus its position or degree of deformation. Such plots are depicted in FIGS. 3A and 3B, which represent a plot of potential energy, E, of the deformable member of the bi-stable device on the Y axis, versus the position, P, or degree of displacement of the deformable member on the X axis. In both FIGS. 3A and 3B, positions P1 and P3 represent stable positions (e.g., the upper stable position of deformable member 14 in FIG. 1A and the lower stable position of deformable member 14 in FIG. 1B). Positions P1 and P3 on the plots of FIGS. 3A and 3B are also known as "energy wells". All of the positions along the plots between P1 and P3 represent unstable transitory positions that the deformable member passes through while moving from position P1 to position P3. Position P2 is a position of maximum instability, which would be represented by the deformable member 14 in FIG. 1 being in a position halfway between that shown in FIGS. 1A and 1B.

Compared to the plot shown in FIG. 3A, the plot shown in FIG. 3B has relatively shallow energy wells. A device with such characteristics would be relatively easy to move between stable positions. However, those positions may not be sufficiently stable for many applications, such that vibration, jolts, or incidental external contact could cause the FIG. 3B device to undesirably move from one of the stable positions to the other stable position. The plot shown in FIG. 3A, on the other hand, represents a device with fairly deep energy wells. A device with such characteristics would be more highly resistant to unintended and undesired movement between stable positions. However, the steepness of the energy wells and the relatively greater energy levels required to move from one of the stable positions up to the peak at P2 in order to get to the other stable position may make the FIG. 3A device too difficult to move between stable positions, rendering it unsuitable for many applications. Thus, there continues to be a need for deformable bi-stable devices that offer good stability of the stable positions, but that can be readily moved between the stable positions when desired.

SUMMARY OF THE INVENTION

In one exemplary embodiment, a deformable bi-stable device includes an elastically deformable member having at least two stable configurations and capable of being deformed from a first stable configuration to a second stable configuration, the element passing through an unstable configuration as it is deformed from the first stable configuration to the second stable configuration, and a shape memory polymer layer on or in the elastically deformable member.

In another exemplary embodiment, there is a method of operating a deformable bi-stable device that includes an elastically deformable member having at least two stable configurations and capable of being deformed from a first stable configuration to a second stable configuration, the element passing through an unstable configuration as it is deformed from the first stable configuration to the second stable configuration, and a shape memory polymer layer on or in the elastically deformable member. The method includes heating the shape memory polymer to a temperature sufficient to reduce the modulus of the shape memory polymer, deforming the deformable member to move from one of the first and second stable configurations to another of the first and second stable configurations, and cooling the device to a temperature sufficient to increase the modulus of the shape memory polymer.

The above features and advantages, and other features and advantages of the invention are readily apparent from the following detailed description of the invention when taken in connection with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DESCRIPTION OF THE EMBODIMENTS

Figure 1A:
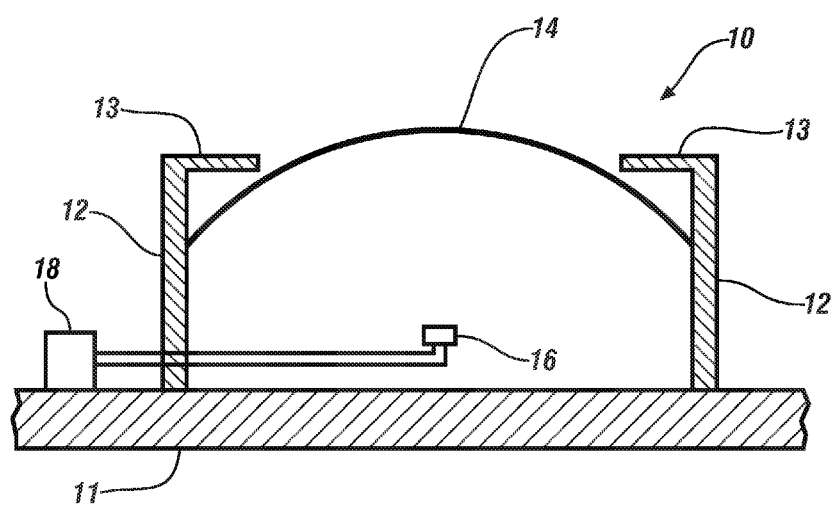
FIGS. 1A and 1B depict a schematic diagram of an exemplary bi-stable device having a deformable member.

The following description is merely exemplary in nature and is not intended to limit the present disclosure, its application or uses. It should be understood that throughout the drawings, corresponding reference numerals indicate like or corresponding parts and features.

Figure 1B:
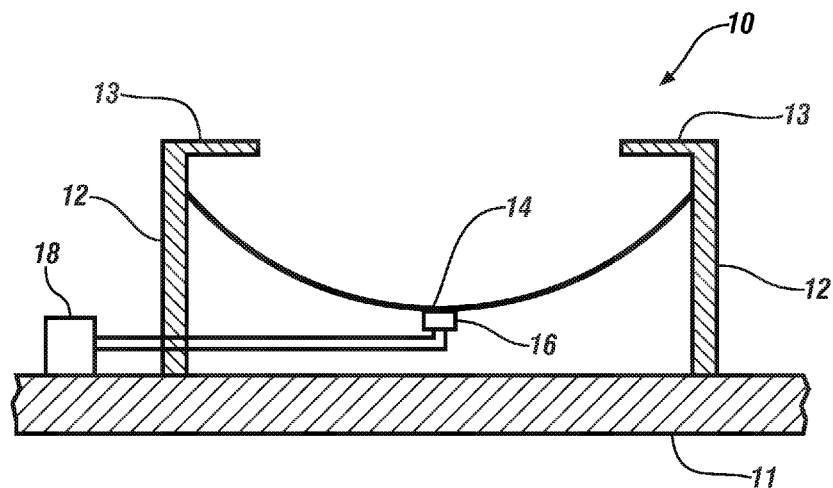
Figure 2A:
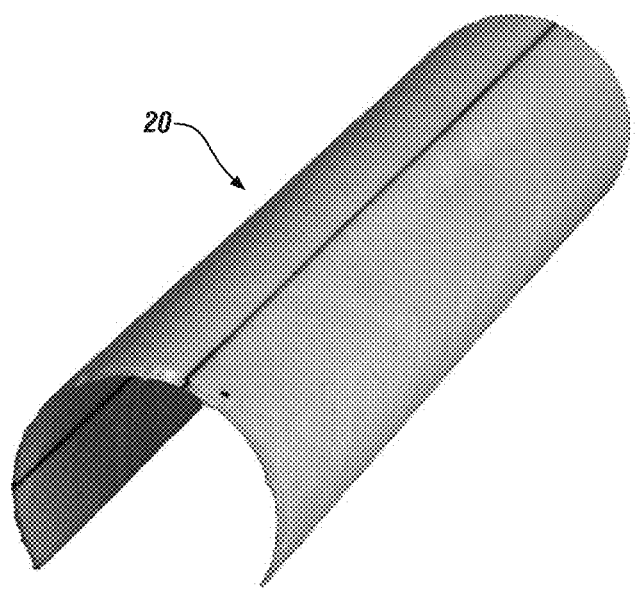
FIGS. 2A and 2B depict a schematic diagram of an exemplary bi-stable cylindrical shell device having at least two stable positions.
Figure 2B:
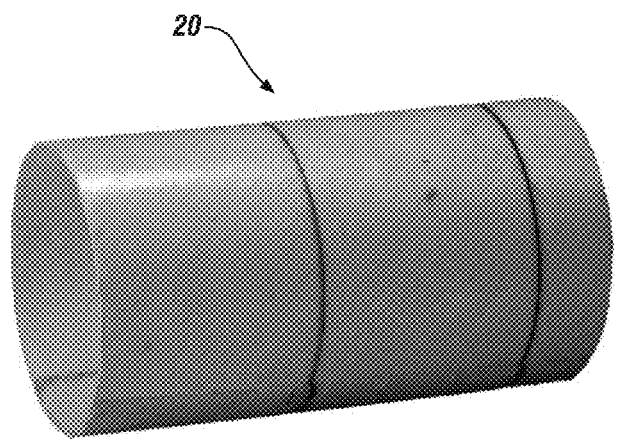
Figure 4:
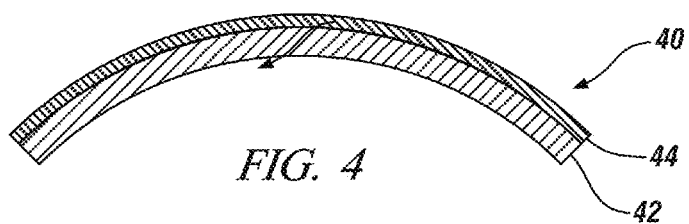
FIG. 4 depicts a schematic diagram of a deformable panel useful in an exemplary embodiment of the invention.
Figure 5:
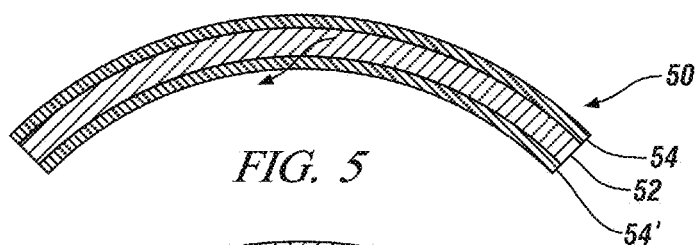
FIG. 5 depicts a schematic diagram of a deformable panel useful in an exemplary embodiment of the invention.
Figure 6:
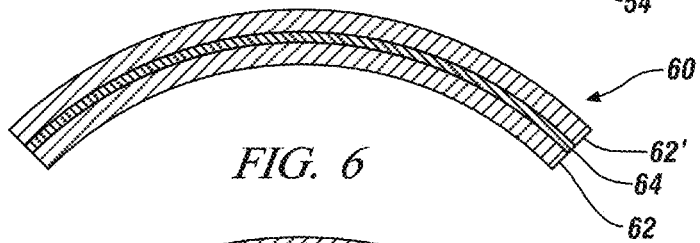
FIG. 6 depicts a schematic diagram of a deformable panel useful in an exemplary embodiment of the invention.
Figure 7:
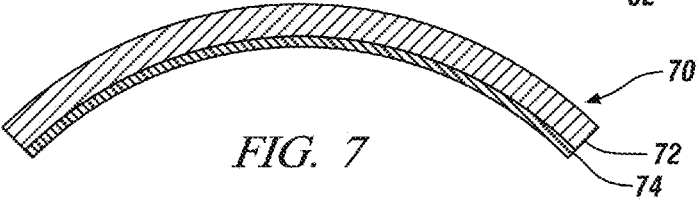
FIG. 7 depicts a schematic diagram of a deformable panel useful in an exemplary embodiment of the invention.

Turning now to the Figures, FIG. 4 depicts a schematic cross-sectional diagram of an elastically deformable component 40 that could be used as the deformable panel 14 in the device of FIG. 1, or to form a cylindrical shell as shown in FIG. 2, or for any other configuration of deformable bi-stable device. In FIG. 4, elastically deformable member 42 has a layer of shape memory polymer 44 disposed on top of the deformable member layer. In FIG. 5, there is shown an elastically deformable component 50 comprising elastically deformable member 52 having thereon an upper layer of shape memory polymer 54 and a lower layer of shape memory polymer 54'. In FIG. 6, there is shown an elastically deformable component 60 having elastically deformable member lower portion 62 and elastically deformable member upper portion 62', with a layer of shape memory polymer 64 sandwiched in between. In FIG. 7, there is shown an elastically deformable component 70 wherein elastically deformable member 72 has a layer of shape memory polymer 74 disposed on the bottom of the deformable member layer. Of course, these are representative configurations, and other configurations could be utilized as well.

Figure 3A:
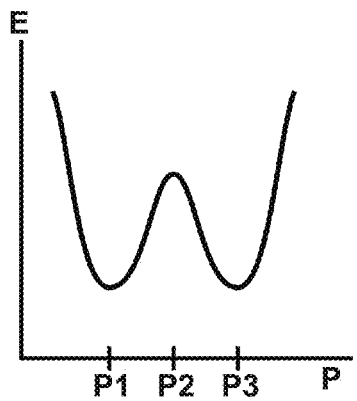
FIGS. 3A and 3B depict energy versus displacement plots of deformable bi-stable devices.
Figure 3B:
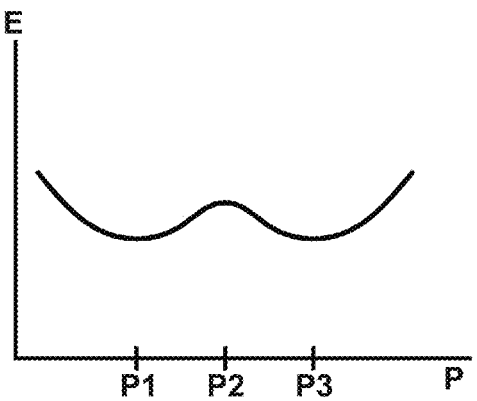

The devices and elastically deformable components described allow for the deformation performance characteristics of the components to be controllably varied so that a deformable component can be readily moved from one stable position to another stable position (i.e., so that it exhibits a deformation plot more like FIG. 3B) or so that the deformable component can be more resistant to being moved out of the stable position that it is already in (i.e., so that it exhibits a deformation plot more like FIG. 3A). This is accomplished by heating the layer(s) comprising the shape memory polymer(s) to a temperature sufficient to reduce its modulus, and thereby achieve the desired ease of deformation of the deformable component. When the layer(s) comprising the shape memory polymer(s) is/are allowed to cool, the modulus increases, thereby making it more difficult to move the deformable component out of the stable position that it is already in.

"Shape memory polymer" or "SMP" generally refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the pad conform to a given surface. The maximum strain that the SMP can withstand in this case can, in some embodiments, be comparable to the case when the SMP is deformed above its thermal transition temperature.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly(ethylene vinyl acetate), polyethylene, polyethylene oxide)-poly(ethylene terephthalate), polyethylene/nylon (graft copolymer), polycaprolactones-polyamide (block copolymer), poly(caprolactone)diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

A shape memory polymer may be utilized for any of the embodiments described herein, and in some exemplary embodiments is used when it is desired to provide some level of bias toward one of the stable positions. This would be accomplished by raising the temperature of the layer above the thermal transition temperature of the SMP while it is in the position toward which bias is desired, followed by cooling to a temperature below the thermal transition temperature while maintaining that position. This biasing may be done to reduce the difference in the depths of energy wells in a bi-stable device having asymmetrically stable positions, or to purposely make one energy well deeper than another or to increase the difference in the depths of energy wells in a bi-stable device having asymmetrically stable positions. In another exemplary embodiment, the shape memory polymer may be allowed to set up at an unstable position (e.g., P2 in FIG. 3) so that it can provide bias to assist in moving the elastically deformable member from either of the stable positions toward the neutral unstable position. This could be accomplished, for example, by heating the SMP on the deformable panel 14 of FIG. 1 when it is in its flat state (e.g., before it is placed under horizontal load and deformed into either of the stable positions of FIGS. 1A and 1B).

The material for the elastically deformable member may be any material having a modulus of elasticity so that it provides the desired stiffness for the particular device design parameters (e.g., length and cross-sectional area, length-width-thickness, surface area and cross-sectional area). Suitable materials may include metals such as steel and steel alloys, aluminum, phosphor-bronze, beryllium-copper, spring (blue-temper) steels, brass, and bronze and hardened and tempered versions of the above, thermoplastics, and thermoset resins such as epoxies, cross-linked acrylics, cross-linked urethanes, and the like. In an exemplary embodiment where the elastically deformable member comprises a plastic material, the material is chosen so that the elastically deformable member's modulus will not be undesirably excessively affected when the SMP layer is heated to reduce its modulus. In such exemplary embodiments, the modulus of the elastically deformable member will be sufficiently high at the elevated temperatures used to reduce the modulus of the SMP that desired device overall stiffness levels of the composite deformable component will be achieved.

The composite deformable bi-stable devices described herein allow the modulus of a deformable component of the device to be controllably modified by heating and cooling (or allowing to cool) the SMP layer(s). In one exemplary embodiment, the plastic layer provides sufficient stiffness at normally encountered (ambient) operating temperatures to effectively lock the deformable component of the bi-stable device in place against displacing forces that would normally be encountered during operation of the device. In this embodiment, heat would be applied to unlock the deformable component upon the occurrence of predetermined operating conditions. In another exemplary embodiment, a deformable bi-stable device may be subject to different actuation modes to cause movement of the deformable component between stable positions. The composite elastically deformable component that comprises the elastically deformable member and the SMP layer may be assembled using any of a variety of conventional techniques, including but not limited to coating or casting a polymer composition onto a pre-formed metal or plastic deformable member, laminating pre-formed polymer films with preformed metal or plastic deformable members, co-molding or co-extruding a plastic deformable member with an SMP layer, and other techniques as known in the art.

The devices of the exemplary embodiments described herein may be used in various applications, including but not limited to as push-buttons, as the walls in conduits to control/vary the flow therethrough, as variable position flow control (drag and lift) for exterior surfaces, for creating controllable/reversible interference fits such as desirable in the caps of medication containers and child safety locks, controllable sealing forces for swing panels—popped down for ease of opening and closing, popped up for enhanced perimeter sealing when panel closed. When they are used, for example, in push-button applications, the reconfigurable bi-stable devices allow for a position of a push-button to be actuated by system control (e.g., an electronic controller) in addition to being actuated by operator input (e.g., manual pressing of a button). System control actuation of a push-button enables the button position to provide a visual and/or tactile cue to the user of the operational state of a device being controlled by the button, as well as to actually change the operational state of the device being controlled by the button without the need for a system controller to override the operational state as set by the push-button, e.g., where the button is connected to an electromechanical control device such as an electrical switch. In an exemplary embodiment, an electrical switch or sensor 16 in a circuit connected to a controller or electronic sending unit 18 is disposed between support structure 11 and panel 14 below the center point of the panel such that when panel 14 is in the lower position as shown in FIG. 1B, it actuates a contact member that trips the switch out of a spring-biased normally open our closed position.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application. The terms "front", "back", "bottom", "top", "first", "second", "third" are used herein merely for convenience of description, and are not limited to any one position or spatial orientation or priority or order of occurrence, unless otherwise noted.

The invention claimed is:

1. A method of operating a deformable bi-stable composite device that comprises an elastically deformable member and a layer comprising a shape memory polymer on or in the elastically deformable member, the composite device having at least two stable configurations and capable of being deformed from a first stable configuration of minimal potential energy to a second stable configuration of minimal potential energy, said composite device passing through an unstable configuration of peak potential energy as it is deformed from the first stable configuration to the second stable configuration, the method comprising:

heating the shape memory polymer to a temperature sufficient to reduce the modulus of the shape memory polymer;

elastically deforming the elastically deformable member with external force applied to the composite device while the shape memory polymer is in the reduced-modulus state to move the device from one of the first and second stable configurations to another of the first and second stable configurations; and cooling the device to a temperature sufficient to increase the modulus of the shape memory polymer.

2. The method of claim 1, wherein the elastically deformable member comprises metal.

3. The method of claim 1, wherein the elastically deformable member comprises a plastic having a glass transition temperature greater than the glass transition temperature of the shape memory polymer, and the temperature to which the shape memory polymer is heated to lower its modulus is below the glass transition temperature of the elastically deformable member.

4. The method of claim 1, wherein the shape memory polymer layer is a coating on an outer surface of the elastically deformable member.

5. The method of claim 1, wherein the shape memory polymer layer is an internal layer within the elastically deformable member.

6. The method of claim 1, wherein an electrical switch or sensor is disposed in proximity to the elastically deformable member and configured to generate or interrupt an electrical signal when the elastically deformable member is moved from one of the first and second stable deformed positions to another of the first and second stable deformed positions.

7. The method of claim 1, wherein the elastically deformable device is a bi-stable cylindrical shell, deformable between a stable linear configuration and a stable coiled configuration.

8. The method of claim 1, wherein the elastically deformable device is a bi-stable snap-action panel, deformable between a convex stable configuration and a concave stable configuration.

9. The method of claim 1, wherein the external force is applied manually to the composite device to move it from one of the first and second stable configurations to another of the first and second stable configurations.

* * * * *